United States Patent
Moriarty

(10) Patent No.: US 7,729,574 B2
(45) Date of Patent: Jun. 1, 2010

(54) OPTICAL BEAM FLATTENING USING MULTI-MODE FIBER

(75) Inventor: Daniel T Moriarty, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 12/328,916

(22) Filed: Dec. 5, 2008

(65) Prior Publication Data

US 2009/0208170 A1    Aug. 20, 2009

Related U.S. Application Data

(60) Provisional application No. 60/992,758, filed on Dec. 6, 2007.

(51) Int. Cl.
*G02B 6/26* (2006.01)
*B23K 26/00* (2006.01)

(52) U.S. Cl. .............. 385/28; 385/27; 385/31; 385/123; 385/147; 219/121.6; 219/121.63; 219/121.65; 219/121.67

(58) Field of Classification Search ............ 385/27, 385/28, 31, 123, 88, 89, 92, 139, 147; 219/121.6, 219/121.63, 121.65, 121.67
See application file for complete search history.

(56) References Cited

U.S. PATENT DOCUMENTS

| | | | | |
|---|---|---|---|---|
| 4,842,360 | A  * | 6/1989 | Caro et al. | 385/33 |
| 6,532,244 | B1 | 3/2003 | Dewey et al. | 372/29.014 |
| 7,072,543 | B2 | 7/2006 | Pierce et al. | 385/28 |
| 2004/0037496 | A1* | 2/2004 | Pierce | 385/28 |
| 2004/0071398 | A1* | 4/2004 | Pierce et al. | 385/28 |
| 2009/0208170 | A1* | 8/2009 | Moriarty | 385/28 |

OTHER PUBLICATIONS

"Laser Beam Welding", [online] [retrieved on Apr. 29, 2009] Retrieved from the internet <URL:http://www.joiningtech.com/news/laserbeamwelding_24/>, 8 pages.

* cited by examiner

*Primary Examiner*—Brian M Healy
(74) *Attorney, Agent, or Firm*—Vern Maine & Associates; David A. Rardin

(57) ABSTRACT

The present invention includes a device and method to create a light beam having substantially uniform far-field intensity. Light from a laser source is directed to at least one multimode optical fiber configured produce an intensity profile approximated by a Bessel function.

15 Claims, 8 Drawing Sheets

400

400

OPTICAL BEAM FLATTENING USING MULTI-MODE FIBER

This application claims the benefit of U.S. Provisional Application No. 60/992,758 filed Dec. 6, 2007. This application is herein incorporated in its entirety by reference.

STATEMENT OF GOVERNMENT INTEREST

The present invention was made under Contract No. N00173-05-C-6020 awarded by the US Navy—Navy Research Lab, and the United States Government has certain rights in this invention.

FIELD OF THE INVENTION

The invention relates to optical transmission, and more particularly, to non-Gaussian far-field intensity profiles generated with multimode optical fiber.

BACKGROUND OF THE INVENTION

Existing fiber optic transmission media have employed single mode fiber coupled to free space. Standard single mode fiber produces a Gaussian field radiation profile and a Gaussian far-field beam.

Applications of transmitted optical beams include infrared countermeasures (IRCM), free space optical communications (FSO Com) and laser cutting and drilling for manufacturing.

In the cases of IRCM and FSO Com, a transmitted laser beam is directed to a distant position. The imperfect accuracy of directing the beam requires distributing the transmitted energy across a large enough solid angle that the extent of the receiver will be illuminated. The link budgets which describe the systems require a minimum power level at the receiver. If that power level is exceeded, the additional power is unnecessary and wasted. At present, beam profiles are Gaussian. This is the result of using a single mode fiber (SMF) in the transmit path—the mode within SMF is Gaussian. The width of the far-field Gaussian beams are such that at the edge of the required solid angle, the power must exceed a required amount. The result is excess power being transmitted on bore sight and unused power being transmitted outside the region of interest.

Known applications require that light directed into the optical fiber not fill it; the numerical aperture is smaller than the intrinsic numerical aperture of the optical fiber. They also rely on pure silica cores and require two optical fibers. Fiber lengths are also between 0.2 and 10 meters. Some applications employ graded and step index fiber optic cores or include mode mixers.

In laser beam welding and drilling, a spot is focused on the surface of the work piece. Melting begins and the light energy is converted into thermal energy. For welding, the surface melts and the beam energy is held below the vaporization point of the material. Vaporization is employed for drilling and cutting. Energy distribution across the beam is typically determined by the design of the resonant cavity. This includes mirror curvature, shape and arrangement. It results in photon oscillation within the cavity, creating Transverse Energy Modes (TEMs). Gaussian mode is designated as $TEM_{00}$. Focusing lenses are important in delivering energy to the work material. References such as Joining Technologies' technical article "Laser Beam Welding", found at http://www.joiningtech.com/news/laserbeamwelding_24/, specify that beam profiles should have a Gaussian peak energy at the beam center.

Each application exhibits inefficient energy delivery to the target. Disadvantages are that the Gaussian profile wastes power for infrared countermeasures (IRCM) and free space optical (FSO) communications and limits accuracy for laser drilling and cutting.

What is needed, therefore, are techniques for more efficient transmission systems to more closely match application needs.

SUMMARY OF THE INVENTION

One embodiment of the present invention transmits a top-hat shaped beam profile which reduces the transmitted power required for FSO Com and IRCM and improves accuracy for manufacturing.

Multi-mode fiber can provide a field profile which transforms to a top-hat shape when transmitted. The far-field is the Fourier transform of the near field and multi-mode fiber contains a mode that closely approximates a sinc (a Bessel function).

Embodiments include a beam flattening apparatus comprising a light source including a laser to create an optical signal; at least one multimode optical fiber configured to support a substantially uniform beam intensity, the at least one multimode optical fiber having a proximal receiving end positioned to receive the optical signal from the light source and a distal emitting end from which the multimode optical signal is emitted, whereby the multimode optical signal is described by a Bessel function resulting in a top-hat intensity in the far-field. In other embodiments, the at least one multimode optical fiber comprises at least two multimode fibers, each comprising input and output optics and the optical signal is multimode. For yet other embodiments, a combination of multiple modes produces a laser spectrum width whereby averaging reduces speckle from interfering modes and the optical signal is single mode, mode hopping. Embodiments provide that the multimode fiber excites only directly beneficial modes and the optical signal provides infrared countermeasures. In further embodiments, the optical signal provides laser beam welding and cutting, free space optical communication, and free space optical communication to satellites. For other embodiments, a sixty percent reduction in power is achieved. Embodiments further comprise a beam director.

Embodiments also include a method for laser beam flattening comprising identifying a fiber mode field pattern which produces a top-hat far-field pattern; determining source laser power savings for the fiber mode field pattern; determining fiber material; determining fiber geometries; determining a fiber index profile which produces desired mode fields; and fabricating fibers defined by the material, geometry, and index. For embodiments, the fibers couple to fibers which excite only desired modes and fibers which support only desired modes. In other embodiments, the step of identifying a fiber mode field pattern comprises identifying a combination of simultaneous modes and the laser power savings is about approximately sixty percent. In yet another embodiment, the fibers produce an infrared countermeasures optical signal.

An embodiment is a beam flattening system comprises a light source that includes a laser to create an optical signal. It has at least one multimode optical fiber that is configured to support substantially uniform beam intensity, the optical fiber having a proximal receiving end positioned to receive the optical signal from the light source and a distal end from which the optical signal is emitted.

In another embodiment, at least two multimode fibers are included, each comprising input and output optics. In yet another embodiment, the light source is multimode. In a further embodiment, the light source is single mode frequency hopping and the transmitted power has uniformity across the solid angle of interest.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

An optical transmission system far-field intensity distribution is a function of fiber cladding diameter, spool diameter, the number of fiber loops, and the wavelength of the light.

The transmission mode of single mode fiber (SMF) is Gaussian. The widths of far-field Gaussian beams are such that at the edge of the required solid angle, the power must exceed a required amount. The result is excess power being transmitted on bore sight and unused power being transmitted outside the region of interest.

By recognizing that the far-field pattern is the Fourier transform of the mode field pattern within the beam director, it is desirable to create a Bessel function (essentially a sinc function in cylindrical coordinates) which results in a top-hat intensity in the far-field.

Regarding the far-field, a criterion for IRCM is that targets be in the far-field of the transmitter. In the far-field, light waves are parallel. The target range can be deduced as $R=D^2/\lambda$ where D is the transmitter diameter and $\lambda$ is wavelength of the radiation.

Common multi-mode optical fiber will support this top-hat far-field mode. The result of using a top-hat far-field pattern can be a reduction of 60% or more of requirements of source laser power. Multi-mode fiber supports many modes in addition to the mode which results in a top-hat far-field pattern. This is addressed by at least two methods.

First, a combination of several modes may approximate a top-hat far-field pattern, thus providing most of the desired benefits. For IRCM, the laser spectrum is generally wide enough that speckle from interfering modes will average away.

Second, a properly designed multi-mode fiber may be capable of exciting only those modes which are directly beneficial. Directly beneficial modes meaning those modes that contribute to create a Bessel function which results in a top-hat intensity in the far-field. Fiber parameters can include graded and step index profiles.

An embodiment of a beam flattening solution comprises two stages.

For stage 1; identify the ideal fiber mode field pattern or combination of simultaneous modes which produce various top-hat or nearly top-hat far-field patterns. Determine the source laser power savings for each of the combinations. For example, 60 percent. Infrared wavelengths could include 3-5 and 8-12 microns.

For stage 2: Determine candidate fiber material, geometries, and index profiles which produce desired mode fields. Fabricate fibers or couple to fibers which excite or support only the desired modes.

Nonlimiting embodiments of mode mixers include bends, loops, crimps, and designed inherent fiber properties.

Figure 1:
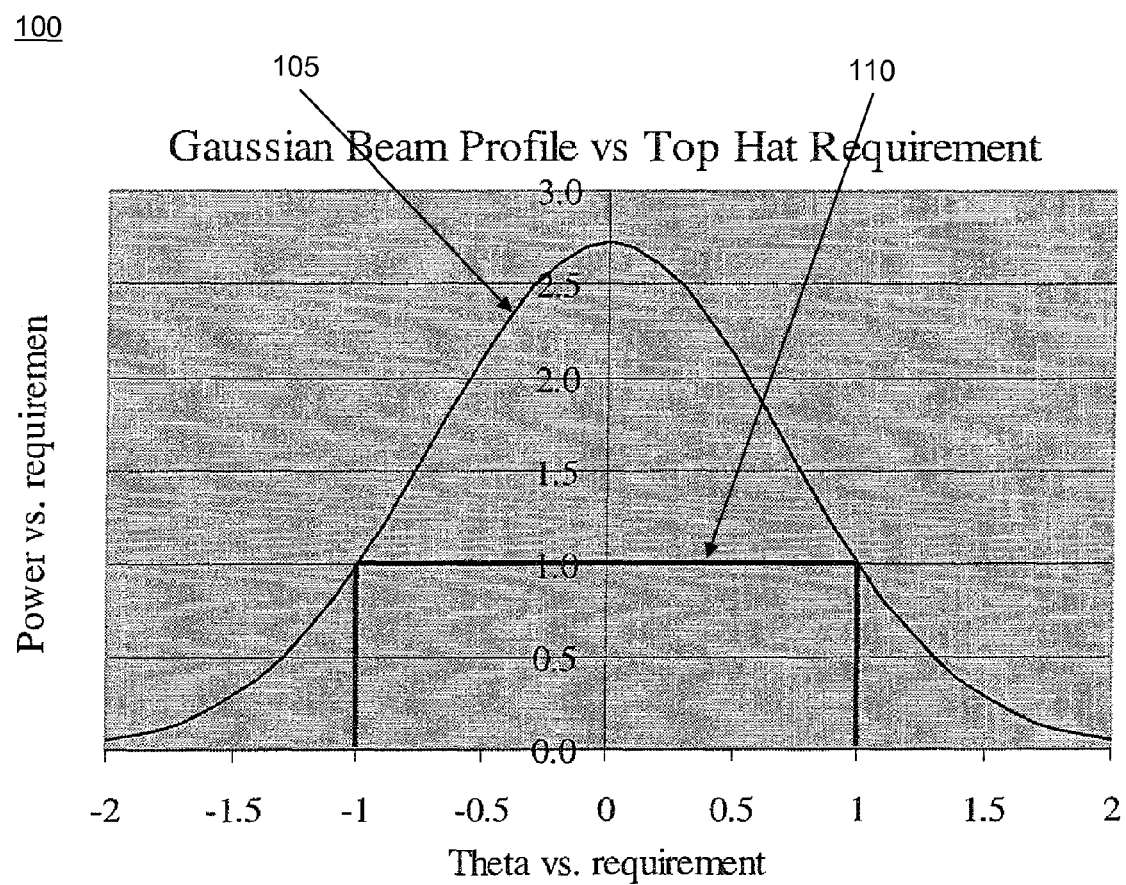
FIG. 1 shows a graph depicting a Gaussian Beam Profile versus a Top-hat Beam profile.

FIG. 1 depicts a graph 100 of a Gaussian Beam Profile 105 versus a Top-hat Beam 110 with Power and Angle Theta axes. It shows power versus requirements as a function of angle theta for a Gaussian beam profile versus a top-hat profile, normalized to one.

Figure 2:
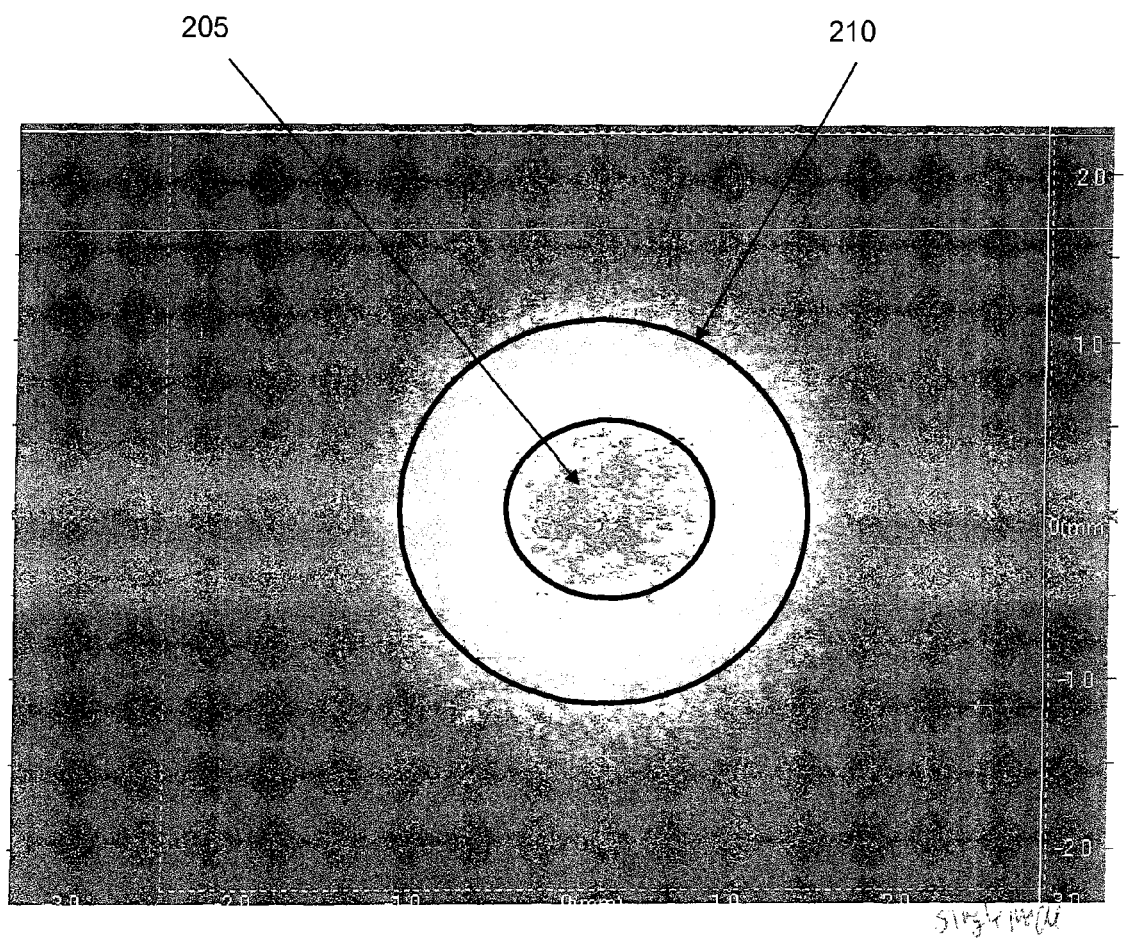
FIG. 2 shows the far-field pattern from a single mode fiber.

FIG. 2 depicts the far-field pattern 200 from a single mode fiber. The Gaussian nature of the profile has more power at bore sight 205 and less power with increasing radius 210.

Figure 3:
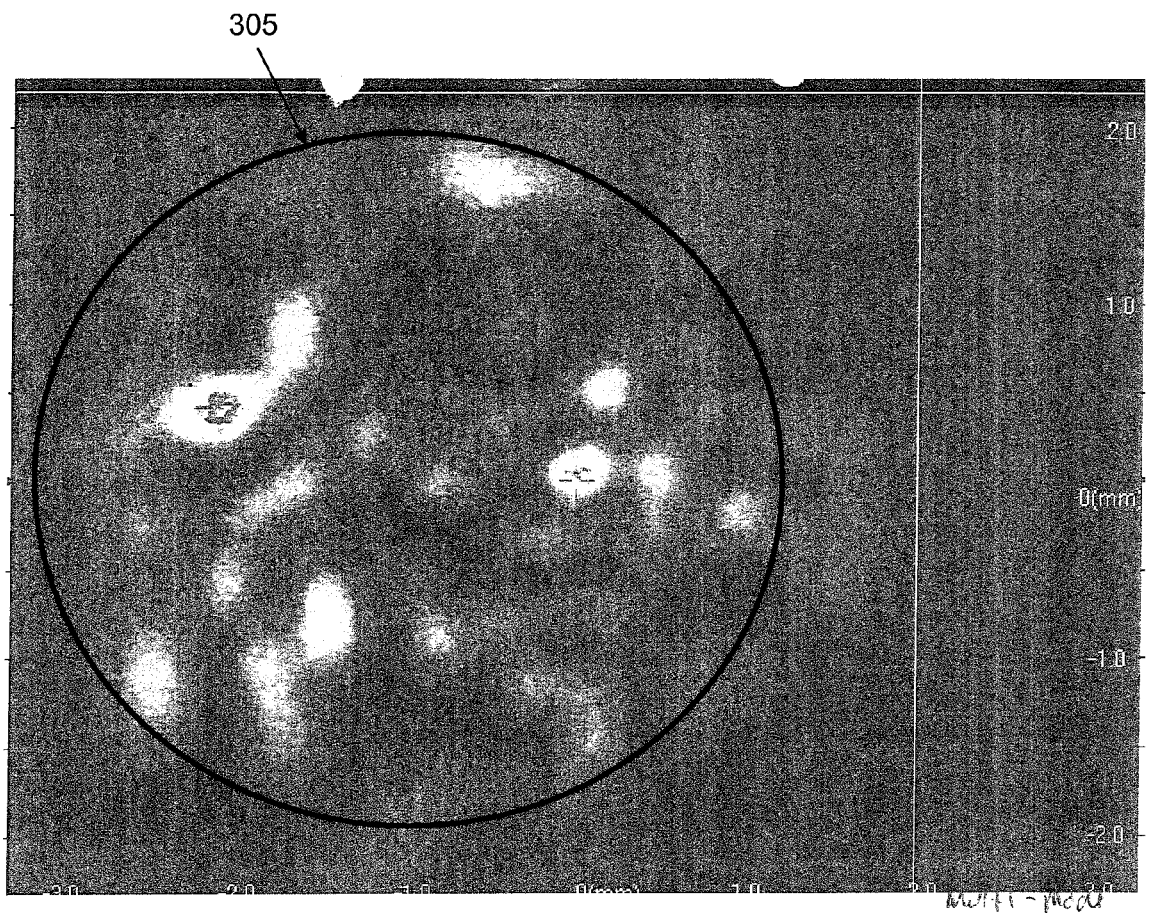
FIG. 3 shows the far-field intensity pattern of a standard telecom multi-mode fiber.

FIG. 3 shows the far-field pattern 300 of a standard telecom multi-mode fiber operating at 1550 nm with a 10 MHz line width. Apparent is the interference pattern of the various modes. The high intensity locations all stay within a circular maximum outer radius 305, a maximum theta off bore sight. If the source wavelength were varied, or if polarization paddles were moved, the higher intensity locations would move but stay within the same circular boundary 305.

Figure 4:
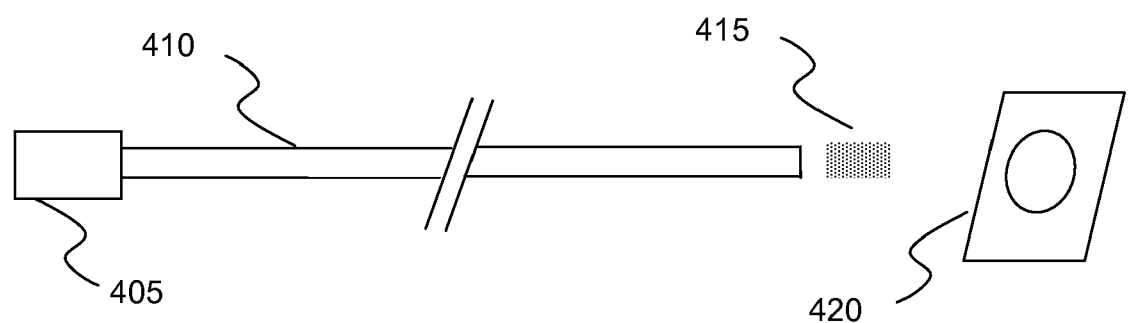
FIG. 4 depicts a far-field top-hat transmission system configured in accordance with an embodiment.

FIG. 4 depicts a simplified diagram of a far-field top-hat transmission system 400 configured in accordance with an embodiment. Light source 405 illuminates proximate end of multimode fiber 410. Light emitted from distal end of multimode fiber 410 exhibits a top-hat pattern in the far-field 415, illuminating target 420.

Figure 5:
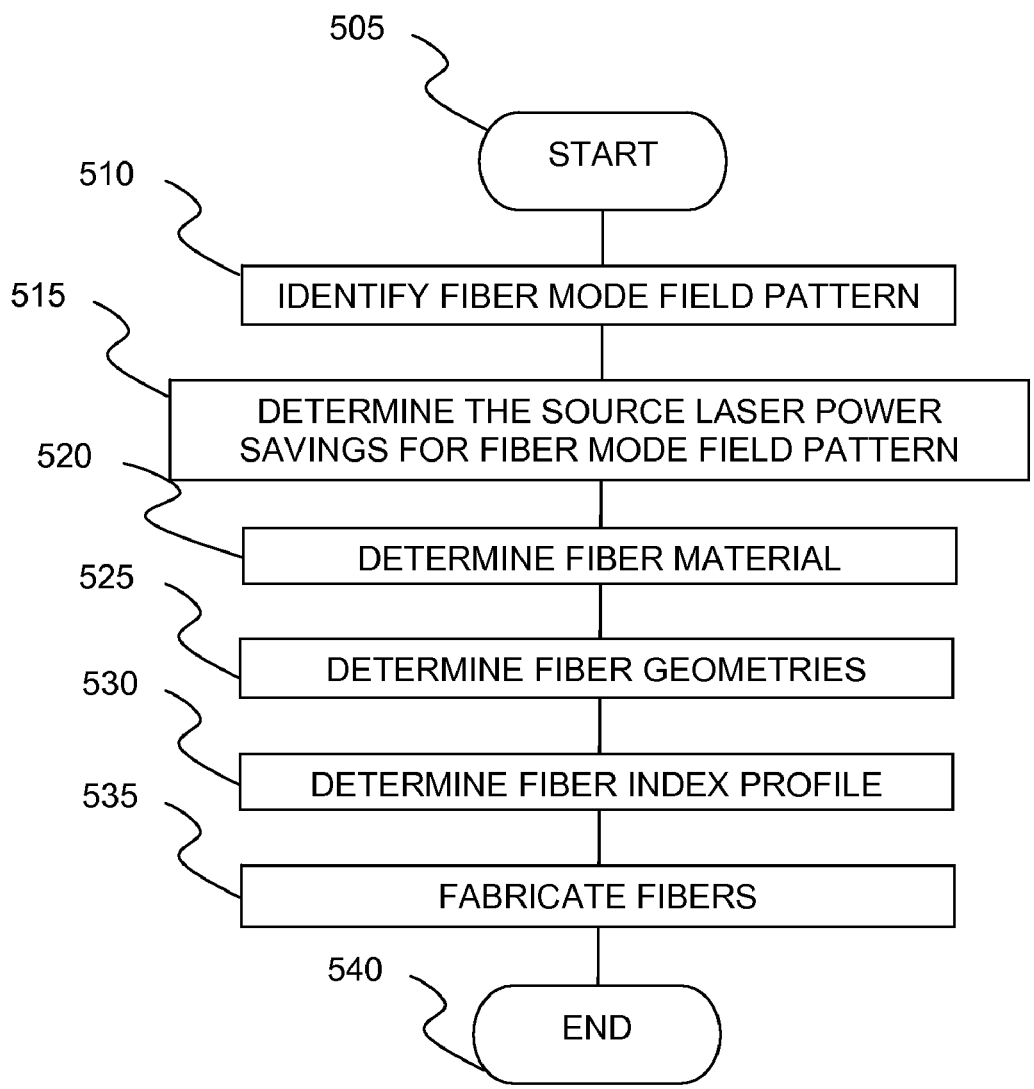
FIG. 5 is a flow chart of a method of far-field top-hat pattern multimode fiber designation configured in accordance with an embodiment.

FIG. 5 is a flow chart of a method of far-field top-hat pattern multimode fiber designation 500 configured in accordance with an embodiment. From start 505, step 510 identifies fiber mode field pattern; step 515 determines the source laser power savings for the fiber mode field pattern; step 520 determines the fiber material; step 525 determines fiber geometries; step 530 determines the fiber index profile; in step 535 fibers are fabricated; with end step 540.

Figure 6:
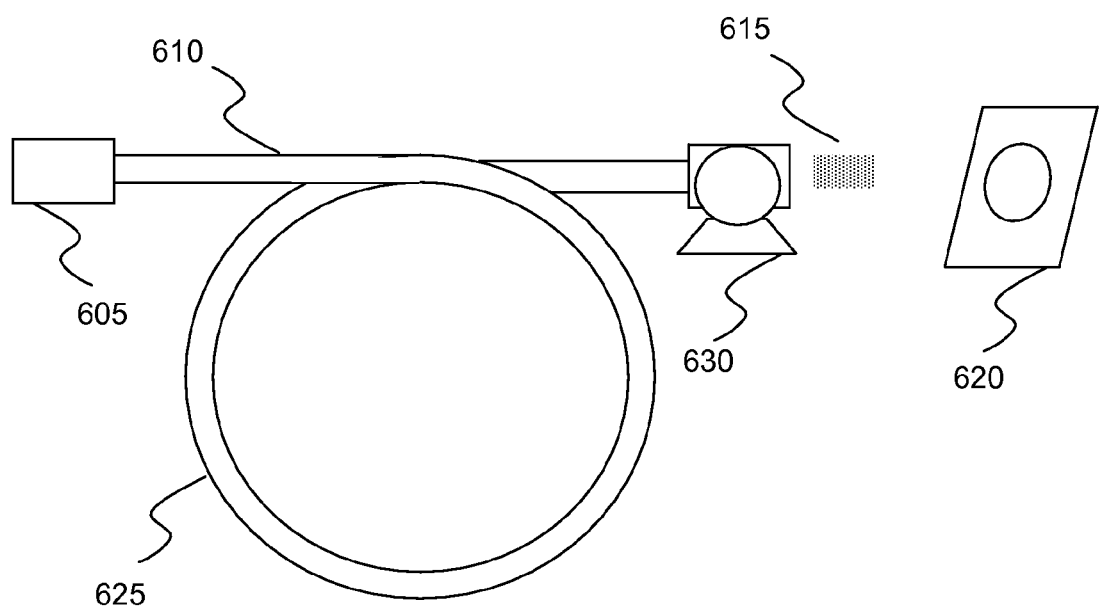
FIG. 6 depicts an infrared countermeasure far-field top-hat transmission system configured in accordance with an embodiment.

FIG. 6 depicts a simplified diagram of an embodiment of an infrared countermeasure far-field top-hat transmission system 600. Light source 605 illuminates proximate end of multimode fiber 610. Light emitted from distal end of multimode fiber 610 exhibits a top-hat pattern in the far-field 615, illuminating IR countermeasure target 620. Multimode fiber 610 incorporates mode mixer 625, increasing mode count and beam uniformity. Beam director 630 provides alignment to target 620. Beam director 630 comprises a base with an upward reflecting mirror mounted to align with s second mirror elevated with respect to the first mirror. The horizontal position of the elevated mirror may be adjustable to translate the beam horizontally without altering its direction angle. The elevated mirror may be additionally rotatable about horizontal and vertical axes to vary the beam direction angle.

Figure 7:
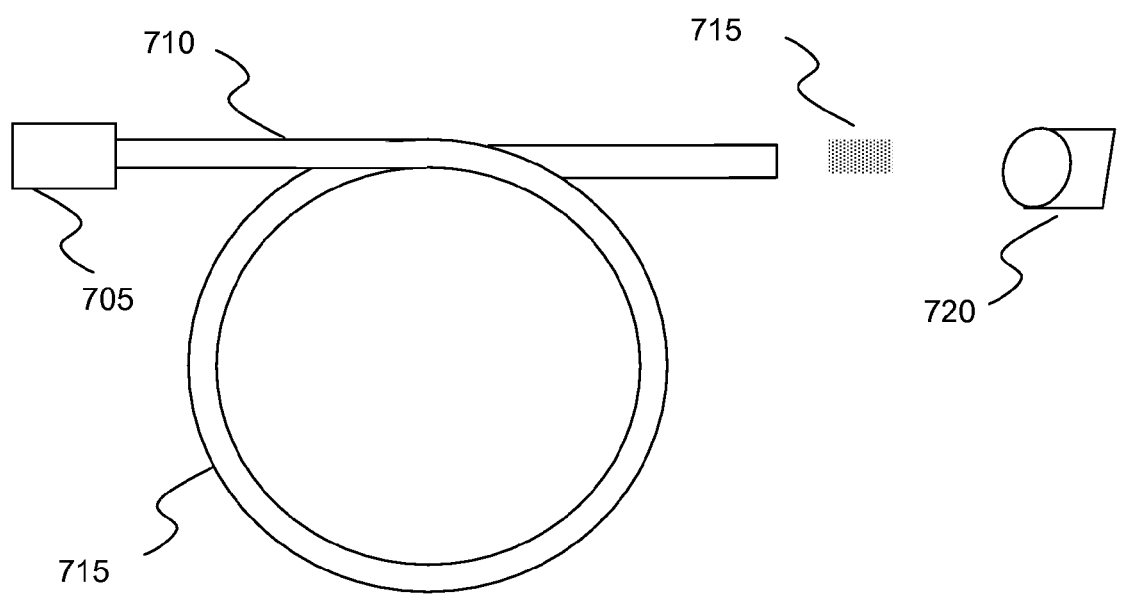
FIG. 7 depicts a free space optical communication far-field top-hat transmission system configured in accordance with an embodiment.

FIG. 7 depicts a simplified diagram of a free space optical communication system 700 including a far-field top-hat beam pattern. Light source 705 illuminates proximate end of multimode fiber 710. Light emitted from distal end of multimode fiber 710 exhibits a top-hat pattern in the far-field 715, illuminating communications receiver 720. Multimode fiber 710 incorporates mode mixer 725 increasing mode count and beam uniformity. Embodiments of free space commercial lasercom to satellites employ top-hat shaped beam profiles.

Figure 8:
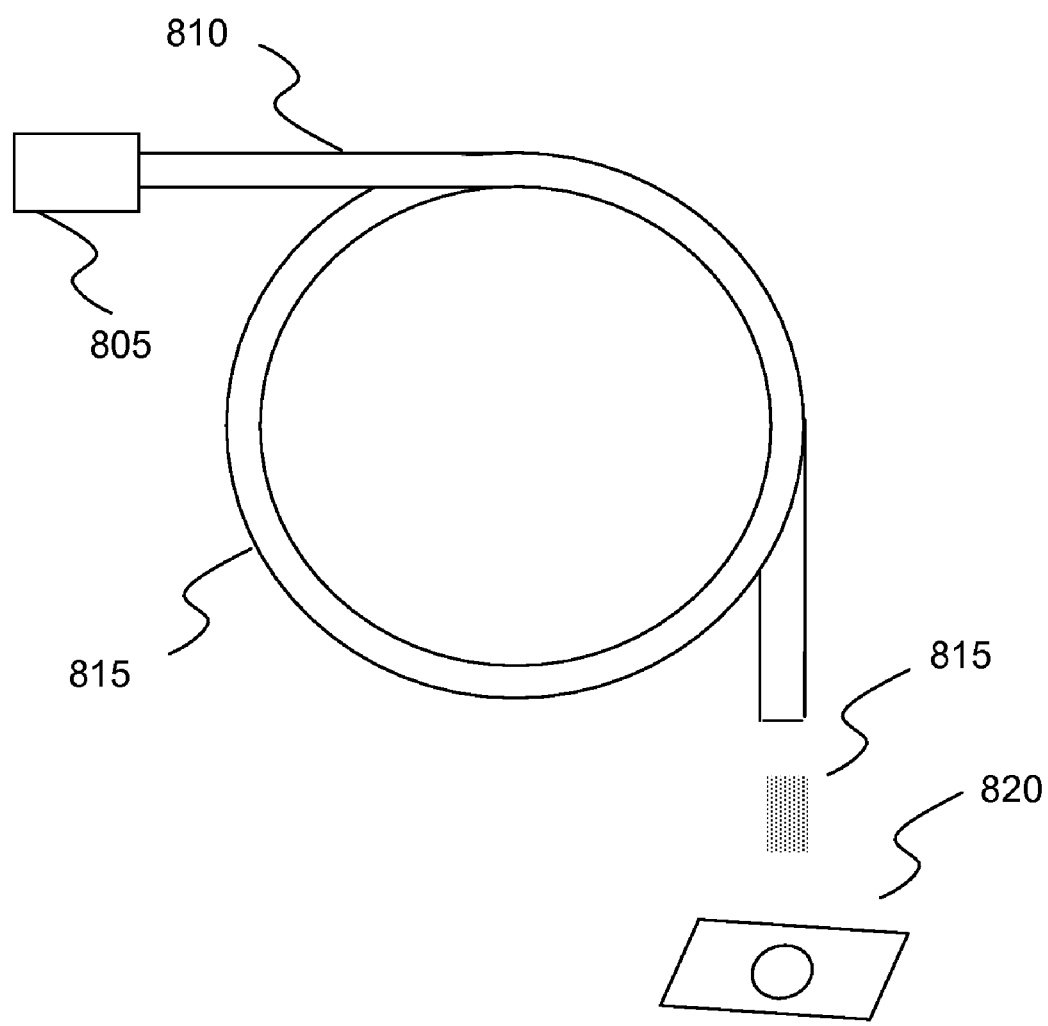
FIG. 8 depicts a laser drilling/cutting far-field top-hat transmission system configured in accordance with an embodiment.

FIG. 8 depicts a simplified diagram of a laser drilling/cutting far-field top-hat transmission system embodiment 800. Light source 805 illuminates proximate end of multimode fiber 810. Light emitted from distal end of multimode fiber 810 exhibits a top-hat pattern in the far-field 815, illuminating target material 820 for drilling or cutting. Multimode fiber 810 incorporates mode mixer 825 increasing mode count and beam uniformity. Laser cutting has accuracy tolerance limitations partly due to lack of a definite boundary to the beam. A top-hat far-field pattern increases precision and may reduce bubbling or damage to material caused by non uniform beam intensity and excessive heat.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A beam flattening apparatus comprising:
   a light source including a laser to create an optical signal;
   at least one multimode optical fiber configured to support a substantially uniform beam intensity, said at least one multimode optical fiber having a proximal receiving end positioned to receive said optical signal from said light source and a distal emitting end from which said multimode optical signal is emitted, whereby said multimode optical signal is described by a Bessel function resulting in a top-hat intensity in the far-field, and
   wherein said optical signal provides infrared countermeasures.

2. The apparatus of claim 1, wherein said at least one multimode optical fiber comprises at least two multimode fibers, each comprising input and output optics.

3. The apparatus of claim 1, wherein said optical signal is multimode.

4. The apparatus of claim 1, wherein a combination of multiple modes produces a laser spectrum width whereby averaging reduces speckle from interfering modes.

5. The apparatus of claim 1, wherein said optical signal is single mode, mode hopping.

6. The apparatus of claim 1 wherein said multimode fiber excites only directly beneficial modes.

7. A beam flattening apparatus comprising:
   a light source including a laser to create an optical signal;
   at least one multimode optical fiber configured to support a substantially uniform beam intensity, said at least one multimode optical fiber having a proximal receiving end positioned to receive said optical signal from said light source and a distal emitting end from which said multimode optical signal is emitted, whereby said multimode optical signal is described by a Bessel function resulting in a top-hat intensity in the far-field, and
   wherein said optical signal provides laser beam welding.

8. A beam flattening apparatus comprising:
   a light source including a laser to create an optical signal;
   at least one multimode optical fiber configured to support a substantially uniform beam intensity, said at least one multimode optical fiber having a proximal receiving end positioned to receive said optical signal from said light source and a distal emitting end from which said multimode optical signal is emitted, whereby said multimode optical signal is described by a Bessel function resulting in a top-hat intensity in the far-field, and
   wherein said optical signal provides laser beam cutting.

9. A beam flattening apparatus comprising:
   a light source including a laser to create an optical signal;
   at least one multimode optical fiber configured to support a substantially uniform beam intensity, said at least one multimode optical fiber having a proximal receiving end positioned to receive said optical signal from said light source and a distal emitting end from which said multimode optical signal is emitted, whereby said multimode optical signal is described by a Bessel function resulting in a top-hat intensity in the far-field, and
   whereby a sixty percent reduction in power is achieved.

10. The apparatus of claim 1, further comprising a beam director.

11. A method for laser beam flattening comprising:
    identifying a fiber mode field pattern which produces a top-hat far-field pattern;
    determining source laser power savings for said fiber mode field pattern;
    determining fiber material;
    determining fiber geometries;
    determining a fiber index profile which produces desired mode fields; and
    fabricating fibers defined by said material, said geometry, and said index, and
    wherein said fibers produce an infrared countermeasures optical signal.

12. The method of claim 11 wherein said fibers couple to fibers which excite only desired modes.

13. The method of claim 11 wherein said fibers couple to fibers which support only desired modes.

14. The method of claim 11 wherein said step of identifying a fiber mode field pattern comprises identifying a combination of simultaneous modes.

15. A method for laser beam flattening comprising:
    identifying a fiber mode field pattern which produces a top-hat far-field pattern;
    determining source laser power savings for said fiber mode field pattern;
    determining fiber material;
    determining fiber geometries;
    determining a fiber index profile which produces desired mode fields; and
    fabricating fibers defined by said material, said geometry, and said index, and
    wherein said laser power savings is about approximately sixty percent.

* * * * *